Figure 1:
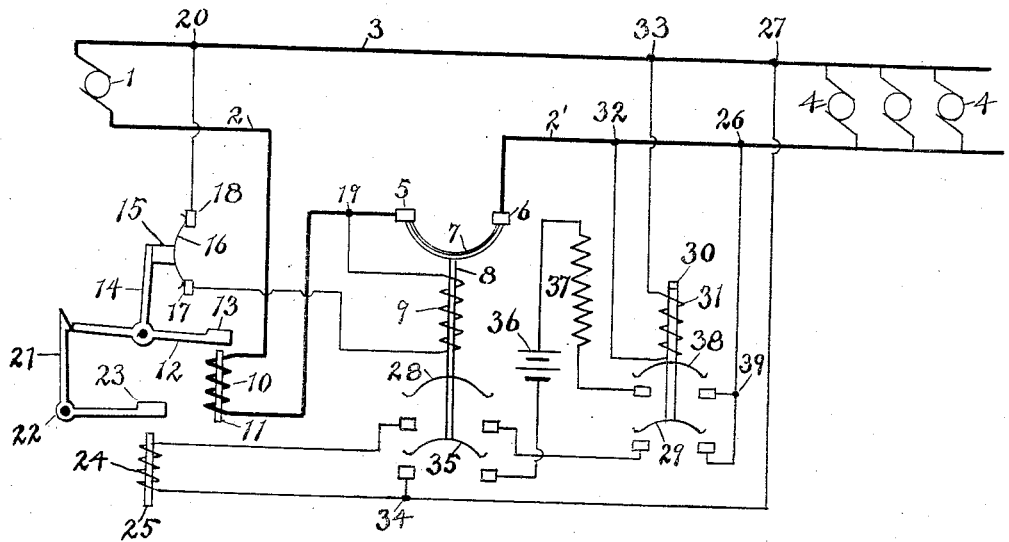

A. R. ANDERSON.
AUTOMATIC CIRCUIT BREAKER.
APPLICATION FILED MAR. 22, 1915.

1,161,278.

Patented Nov. 23, 1915.
2 SHEETS—SHEET 1.

WITNESSES:
H. E. Dean

INVENTOR.
Arvid R. Anderson
BY
Dudley T. Fisher
ATTORNEY.

A. R. ANDERSON.
AUTOMATIC CIRCUIT BREAKER.
APPLICATION FILED MAR. 22, 1915.

1,161,278.

Patented Nov. 23, 1915.
2 SHEETS—SHEET 2.

WITNESSES:
H. C. Dean

INVENTOR.
Arvid R. Anderson
Dudley T. Fisher
ATTORNEY.

UNITED STATES PATENT OFFICE.

ARVID R. ANDERSON, OF COLUMBUS, OHIO.

AUTOMATIC CIRCUIT-BREAKER.

1,161,278.   Specification of Letters Patent.   Patented Nov. 23, 1915.

Application filed March 22, 1915. Serial No. 16,059.

*To all whom it may concern:*

Be it known that I, ARVID R. ANDERSON, a citizen of the United States, residing at Columbus, in the county of Franklin and the State of Ohio, have invented a new and useful Improvement in Automatic Circuit-Breakers, of which the following is a specification.

The present invention relates to certain new and useful improvements in circuit breakers, and especially to that class of circuit breakers which is adapted to open an electric circuit when, from any cause such as a short circuit or an overload, there shall be an excessive flow of current, and shall automatically reclose the circuit upon the restoration of normal working conditions. When the load in such a circuit is composed, either wholly or in part, of motors, if the supply of current be suddenly cut off, a potential will be maintained by the motors acting as generators, until the energy due to the inertia of the armatures and the machinery connected with them, is exhausted.

For many reasons it is undesirable to restore the connection between the source of electrical supply and the load until the motors have been disconnected, either by the hand of the operator or by the action of the automatic no load release switches. It has been customary heretofore to provide automatic reclosing circuit breakers with dash pots, or other similar retarding devices, to prevent the action of the reclosing mechanism until a sufficient time has elapsed for motors contained in the load to come to rest. As the conditions affecting the continuance of rotation of these motors are extremely various, it is obvious, that it will be impossible to adjust such retarding devices to meet all the conditions which might arise. There will be either an excessive waste of time before the restoration of the circuit or an undesirable risk of damage to the apparatus due to too early restoration.

In my copending application of even date I have disclosed a somewhat similar combination of elements adapted to effect the same results as are achieved by the combinations hereinafter set forth, but possessing certain fundamental differences which will appear upon comparison of the two applications.

It is the especial object of this invention to provide, in an automatically reclosing circuit breaker, locking means which shall render the reclosing mechanism inoperative until the disappearance of the potential generated by the elements of the load. The devices by which I accomplish this object are fully set forth in the following specification and illustrated in the accompanying drawings of which—

Figure 2:
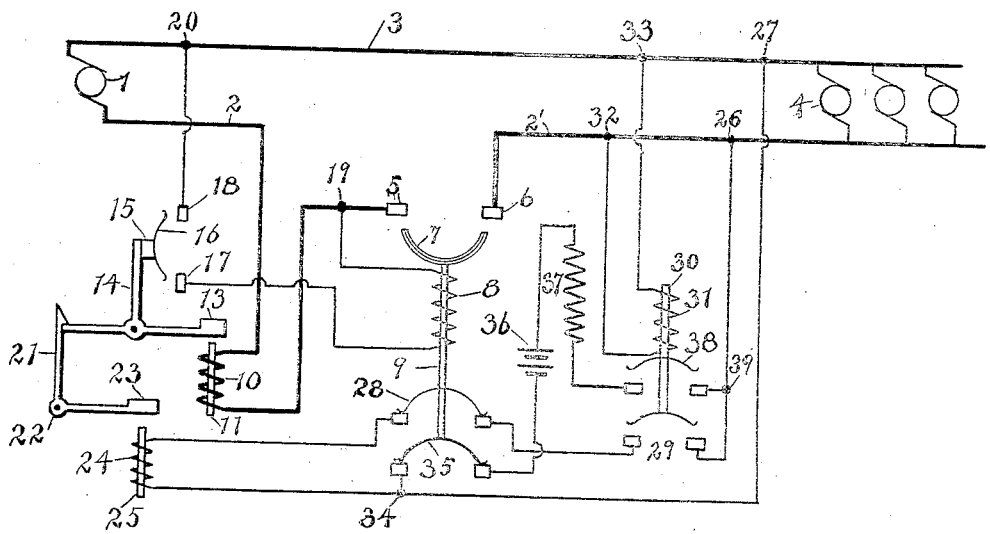
Figure 3:
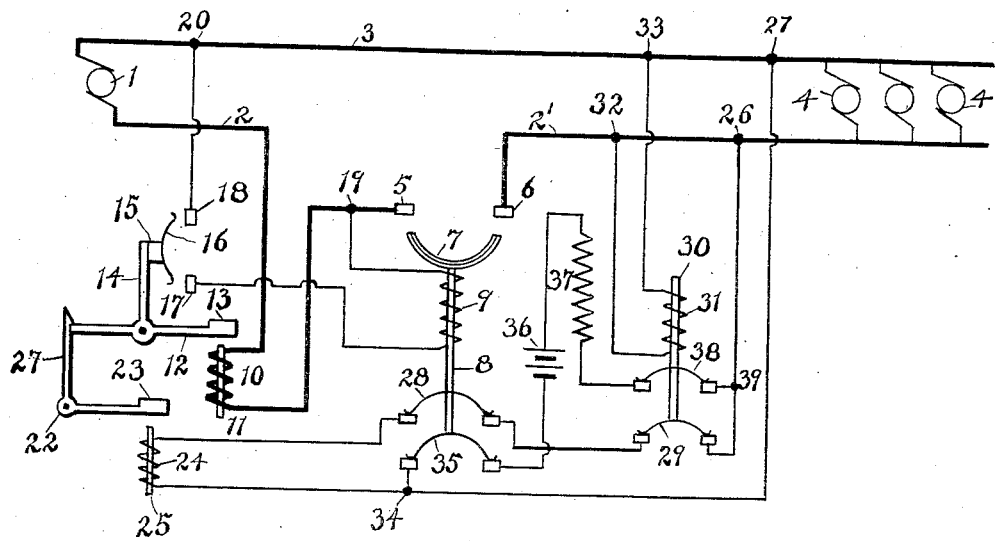
Figure 4:
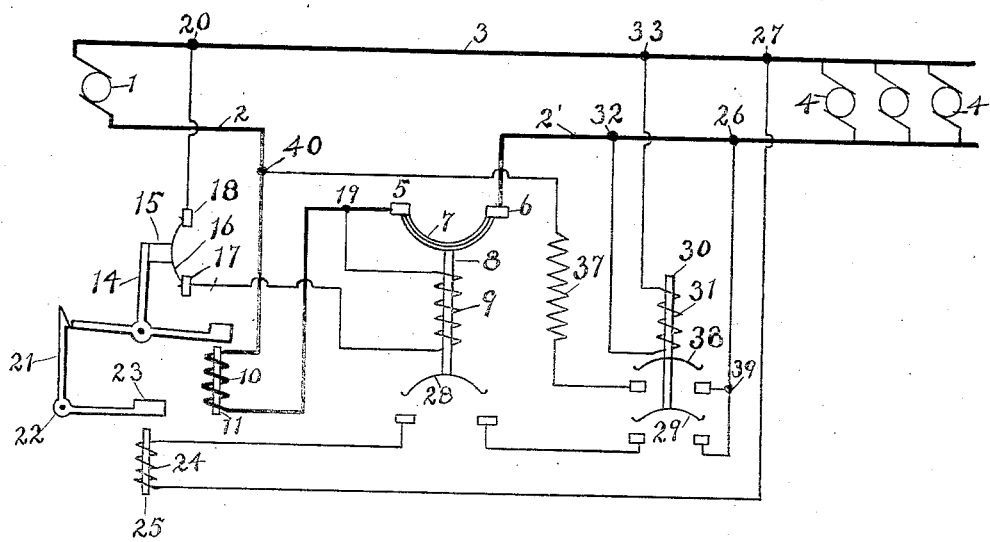

Figure 1 is a diagram showing a circuit including my improved circuit breaker under normal working conditions. Fig. 2 is a diagram illustrating the same circuit after the circuit breaker has opened but before the potential of the load has fallen to a value which will permit the operation of the reclosing mechanism. Fig. 3 is a diagram illustrating the same circuit after the load potential has disappeared and before the reclosing mechanism has acted. Fig. 4 is a diagram showing a modification of the devices in which the reclosing mechanism is controlled by current derived from the main source of electrical supply.

Like numerals refer to similar parts in the several figures.

Referring to the drawings, a generator 1 is connected through the conductors 2 and 3 with a load including the motors 4. In the conductor 2 is included the main break switch of an automatic circuit breaker having contact abutments 5 and 6 adapted to be connected together by the switch member 7. The switch member 7 is attached to and carried by the armature 8 of the solenoid 9, called the reclosing coil, which is arranged to drop to its lower position under the influence of gravity, to break the circuit between the contact abutments and the switch member, or to rise to its upper position under the influence of the solenoid when electrically energized, to close such circuit. The conductor 2 is also connected in series with a solenoid 10, called the overload coil, having an armature 11 adapted to fall by gravity and to rise by the influence of the current flowing through the conductor. Positioned adjacent the overload coil 10 is a lever 12, pivoted near its center and provided with a weight 13 adapted to contact with the armature 11 to be lifted by it to rotate the lever 12 about its pivot. Attached to the lever 12 is a perpendicular arm 14 having an insulating block 15 to which is attached a switch member 16 adapted to contact with the contact abutments 17 and 18 connected in the shunt circuit extending from the point 19 of the conductor 2, through the solenoid 10 to the point 20 of the conductor 3 to supply energy for the reclosing of the main break switch. A latch 21 is provided to engage the lever 12 to hold the switch 16 out of contact with the abutments 17 and 18 to hold the reclosing mechanism inoperative. The latch 21 is pivotally supported at 22 and is provided with a weight 23 to hold it in engagement with the lever 12. Conveniently positioned with relation to the latch 21 is a solenoid 24, called the trip coil, the armature 25 of which is adapted to contact with the weight 23 to raise it and disengage the latch 21 from the lever 12, to allow the switch 16 to reclose to actuate the reclosing coil. The trip coil 24 is included in a circuit extending from the point 26 of the conductor 2', between the main break switch 7 and the load 4, to a point 27 of the conductor 3. This trip coil circuit is adapted to be cut by two switches, 28 and 29, the first of which is attached to the armature 8 and is adapted to be opened when the main break switch 7 is closed, and closed when the switch 7 is open. The switch 29 is attached to the armature 30 of the solenoid 31, called the potential lock coil, which is directly connected with the conductor 2' at 32, and with the conductor 3 at 33, with the result that the switch 29 is always open when there is a sufficient potential across the conductors to actuate the lock coil. A governing circuit, extending from the point 34 on one side of the trip coil circuit, through the switches 35 and 38, to the point 39 on the opposite side of the trip coil circuit, includes a source of electromotive force which, for the purpose of illustration I have shown as a battery 36, the output of which is limited by the rheostat 37. The switch 35 is attached to the armature 8 and is always open when the switch 7 is closed, and the switch 38 is attached to the armature 30 and is always open when there is a potential across the conductors between the main break switch and the load to sufficiently energize the coil 31.

Having now set forth the arrangement of parts I will describe the operation of my circuit breaker. In Fig. 1 I have shown the circuit in normal working conditions with current flowing from the generator 1, through the conductor 2, the overload coil 10, the main break switch 7, the conductor 2' and through the load 4 to the conductor 3 and returning to the generator. The switch 16 being closed through the influence of the weight 13, the current flows from the point 19 on the conductor 2, through the reclosing coil 9, and the switch 16 to the conductor 3 to energize the coil 9 to hold the switch member 7 in contact with the abutments 5 and 6. The weight or position of the armature 11 is so adjusted that a flow of current adequate to the normal load, through the overload coil, will not raise the armature, while a current in excess of that load will cause the armature to rise and engage the lever 12 to open the latch 16, thereby cutting off the current from the coil 9, allowing the armature 8 to fall, opening the switch 7, to protect the apparatus from the injurious effects of such excessive current. When the armature 8 drops to its lower position it closes the switches 28 and 35 of the trip coil circuit, but so long as there is a potential across the conductors 2' and 3, due to the generative action of the elements of the load, the lock coil 31 will hold the switches 29 and 38 open to prevent the actuation of the trip coil 24. This condition of the circuit is illustrated in Fig. 2. As soon as the motors which compose the load have come to rest, and the potential due to their action has disappeared, the coil 31 becomes deënergized, the armature 30 drops, closing the switch 29 to close the trip coil circuit. As the switches 35 and 38 are both closed by the movement of the armatures which close the switches 28 and 29, current from the battery 36 will flow through the rheostat 37 and switch 38 to the point 39 where it will divide, part passing through the switches 29 and 28, the trip coil 24 to the point 34 and thence returning to the battery through the switch 35, while the other part flows from the point 39 to the point 26 conductor 2', through the load 4 and coil 31 in parallel, to the conductor 3, the point 27, point 34, switch 35 to battery. When the resistance of the load circuit is abnormally reduced, either by a short circuit or by overload conditions, to permit a flow of current from the generator 1 sufficient to cause the breaker to open, and while such resistance continues, the balance of resistances between the load 4 and the trip coil 24 will be such that the current from the battery 36, being limited by the rheostat 37, will divide in such proportions that the trip coil will not be sufficiently energized to affect the armature 25. With the removal of the short circuit, or the overload condition, the balance of the resistances between the load and the trip coil will be altered that the armature 25 will be lifted to trip the latch 21 and allow the reclosing of the switch 16 and the reënergizing of the reclosing coil to restore the circuit through the main break switch 7.

The switches 35 and 38 have been found necessary in practice, to protect the battery 36 from possible injury by the electromotive force between conductors 2' and 3, due either to the generator 1 or the generative action of the load 4, while the switches 28 and 29 protect the comparatively delicate coil 24 from injury from the same source. In the arrangement shown in Fig. 4 the battery 36 has been dispensed with and current for the actuation of the trip coil is derived from the generator 1 through a conductor leading out of the conductor 2 at the point 40, and through the rheostat 37 and the switch 38 to the point 39 from which point the current is divided as in the above described arrangement, flowing through the trip coil and the load in inverse proportion to their respective resistances and through the conductor 3 back to the generator 1. The switch 35 not being necessary under the conditions of this last arrangement, has been omitted from the diagram.

What I claim as novel and desire to protect by Letters Patent is—

1. In a circuit breaker, the combination with an automatic circuit opening switch, of means to automatically reclose the switch and means to prevent the operation of the reclosing means while there is a potential in the circuit generated by the elements of the load.

2. In a circuit breaker, the combination with a switch adapted to be included in a circuit between the generator and the load, to open the circuit when a current greater than a predetermined value flows therethrough, of means to automatically reclose the switch and means actuated by the potential in the load to render the reclosing means inoperative.

3. In a circuit breaker, the combination of a switch adapted to open an electric circuit with a current greater than a predetermined value, with means to automatically reclose the switch upon the restoration of normal working conditions in the circuit, and means to render the reclosing means inoperative when there is a potential across the conductors of the circuit remote from the generator relative to the switch.

4. In a circuit breaker, the combination of a switch adapted to open a circuit when a current greater than a predetermined value flows therethrough, with means to automatically reclose the switch upon the restoration of normal working conditions in the circuit, means actuated by a limited electric current to control the action of the reclosing means, and means actuated by potential in the circuit remote from the generator relative to the switch to render the controlling means inoperative.

5. In a circuit breaker, the combination with a circuit opening switch, of electrically actuated means to close the switch, mechanically actuated devices to control the closing means, an overload coil adapted to coact with the controlling devices to open the switch, a trip coil adapted to coact with the controlling devices to close the switch, a limited electric current arranged to energize the trip coil, and devices connected and arranged to exclude the said current from the trip coil when there is a potential in the circuit remote from the generator relative to the switch.

6. In a circuit breaker, the combination with a switch adapted to open an electric circuit when the current therein exceeds a predetermined value, of means to automatically reclose the switch upon the restoration of normal working conditions in the circuit, means actuated by a limited current to control the reclosing means, and means actuated by the potential generated by the elements of the load to control the controlling means.

7. In a circuit breaker, the combination with a main break switch, of overload release mechanism adapted to open the switch, a latch to prevent the reclosing of the switch, a trip coil connected in parallel with the load, a limited electric current adapted to divide between the trip coil and the load in inverse proportion to their respective resistances to effect the release of the latch, and a lock coil in parallel with the load to prevent the action of the trip coil during the generative action of the load.

8. In a circuit breaker, the combination with a main break switch, of a solenoid, connected in parallel with the generator between the generator and the switch, adapted to close and retain the switch, an automatically closing controlling switch connected in series with the solenoid, an overload coil having an armature adapted to engage the controlling switch to open it, a latch adapted to engage the controlling switch to hold it open, a trip coil connected in parallel with the load, having an armature adapted to engage the latch, to release the controlling switch, a source of electric current connected through a rheostat with the trip coil and the load in such manner that a limited electric current will divide between the trip coil and the load in inverse proportion to their respective resistances, a lock switch in series with the rheostat, a lock switch in series with the trip coil, a lock coil connected in parallel with the load to open the two lock switches to prevent the actuation of the trip coil when there is potential in the circuit remote from the generator relative to the main break switch.

ARVID R. ANDERSON.